(12) United States Patent
Iatrides et al.

(10) Patent No.: US 11,656,019 B2
(45) Date of Patent: May 23, 2023

(54) COOLING DEVICE WITH AN ENDOTHERMIC CHEMICAL REACTION

(71) Applicant: MBDA FRANCE, Le Plessis-Robinson (FR)

(72) Inventors: Clément Iatrides, Le Plessis-Robinson (FR); Fabrice Verin, Le Plessis-Robinson (FR)

(73) Assignee: MBDA FRANCE, Le Plessis-Robinson (FR)

( * ) Notice: Subject to any disclaimer, the term of this patent is extended or adjusted under 35 U.S.C. 154(b) by 105 days.

(21) Appl. No.: 16/967,905

(22) PCT Filed: Feb. 5, 2019

(86) PCT No.: PCT/HR2019/050253
§ 371 (c)(1),
(2) Date: Aug. 6, 2020

(87) PCT Pub. No.: WO2019/155155
PCT Pub. Date: Aug. 15, 2019

(65) Prior Publication Data
US 2021/0396447 A1    Dec. 23, 2021

(30) Foreign Application Priority Data
Feb. 12, 2018   (FR) ...................... 1800126

(51) Int. Cl.
*F25D 5/02*   (2006.01)
*B01J 16/00*  (2006.01)
(Continued)

(52) U.S. Cl.
CPC ............... *F25D 5/02* (2013.01); *B01J 16/00* (2013.01); *B01J 19/18* (2013.01); *F25D 5/00* (2013.01);
(Continued)

(58) Field of Classification Search
CPC ........ F25D 5/00; F25D 5/02; F25D 2303/085; B01J 16/00; F42B 15/34; C09K 5/18
See application file for complete search history.

(56) References Cited

U.S. PATENT DOCUMENTS 5,257,755 A * 11/1993 Moser ...................... F25D 5/00
                                                        102/293
2012/0144845 A1 * 6/2012 Leavitt ..................... F25D 5/02
                                                        62/4
2013/0174600 A1    7/2013 Sarcinella

FOREIGN PATENT DOCUMENTS

EP    2695560 A1    2/2014
FR    2819492 A1 *  7/2002  ............... F25D 5/02
(Continued)

OTHER PUBLICATIONS

Machine translation of FR-2819492-A1 (Year: 2001).*
(Continued)

*Primary Examiner* — Joseph F Trpisovsky
(74) *Attorney, Agent, or Firm* — Christensen O'Connor Johnson Kindness PLLC

(57) ABSTRACT

A cooling device uses an endothermic chemical reaction for cooling. The cooling device includes a sealed casing with at least two reagents that generate an endothermic chemical reaction when they come into contact. The cooling device further includes a separating membrane separating the reagents in a storage position; a contact-making system which can be activated and configured to bring the reagents into contact with one another when activated, an interface element for activating the contact-making system; and a thermal interface with a thermally conductive metal base plate. One of the surfaces of the base plate is subjected to the endothermic chemical reaction, and the other surface of the base plate is accessible from outside the cooling device.

11 Claims, 3 Drawing Sheets

(51) Int. Cl.
  *B01J 19/18* (2006.01)
  *F25D 5/00* (2006.01)
  *F42B 15/34* (2006.01)
  *C09K 5/18* (2006.01)
(52) U.S. Cl.
  CPC ..... *F42B 15/34* (2013.01); *B01J 2219/00162* (2013.01); *C09K 5/18* (2013.01); *F25D 2303/085* (2013.01)

(56) References Cited

FOREIGN PATENT DOCUMENTS

| JP | S60113953 A | 6/1985 |
| WO | 2008012515 A2 | 1/2008 |
| WO | 2016110820 A1 | 7/2016 |

OTHER PUBLICATIONS

International Search Report datedMay 29, 2019, issued in corresponding International Application No. PCT/FR2019/050253, filed Feb. 5, 2019, 7 pages.
Written Opinion of the International Searching Authority dated May 29, 2019, issued in corresponding International Application No. PCT/FR2019/050253, filed Feb. 5, 2019, 6 pages.
Written Opinion of the International Searching Authority dated May 29, 2019, issued in corresponding International Application No. PCT/FR2019/050253, filed Feb. 5, 2019, 5 pages.
International Preliminary Report on Patentability dated Aug. 18, 2020, issued in corresponding International Application No. PCT/FR2019/050253, filed Feb. 5, 2019, 1 page.

* cited by examiner

COOLING DEVICE WITH AN ENDOTHERMIC CHEMICAL REACTION

TECHNICAL FIELD

The present invention concerns a cooling device with an endothermic chemical reaction.

STATE OF THE ART

This cooling device is intended to be used in numerous applications. It can thus be used as well in equipment deployed in fixed installation as in equipment embedded on mobile platforms. As an illustration, the cooling device can be used on a land, sea or air vehicle, and also on a missile or more generally on a weapons system.

In the framework of the present invention and of the applications considered, the cooling device must not be sensitive to very severe mechanical and thermal environments and must be able to be easily adapted to strict mass, volume stresses and mechanical interfaces.

As an illustration, when it is mounted on a missile, the cooling device must be able to support very severe thermal and mechanical stresses (in particular, vibratory and acceleration). In particular, concerning thermal stresses, the operating field can be situated in a broad range of temperatures from −55° C. to +125° C.

In this application and in other applications considered, the storage, implementation and use conditions, thus create strong, in particular thermal, stresses on the cooling device before its use.

A cooling device intended to be used on a missile is known, by document U.S. Pat. No. 5,184,470. This cooling device comprises an envelope with a thermal interface containing two compartments. The first compartment contains a water reserve in liquid form and the second compartment contains salts capable of producing an endothermic reaction by dissolution in water. These two compartments are separated by a membrane or a duct, and according to the embodiment, the membrane can be bored by a point with an actuation device or the duct can be opened by a valve in order to achieve the dissolution. The energy absorption (or the cooling) is therefore obtained by the dissolution of salts in water.

In the cooling device of document U.S. Pat. No. 5,184,470, water is therefore necessary to implement the endothermic reaction. Water is stored in the cooling device in liquid form before it is triggered. This storage has important stresses. In particular:

- the storage of water in liquid form for long durations and with temperature conditions being able to vary under the melting point of water and above the boiling point of water, leads to important sizing stresses of the cooling device, which can make it unusable;
- such a cooling device does not allow to trigger the endothermic reaction under all the orientation and acceleration conditions that can be envisaged. Indeed, even when the membrane is bored or that the valve is opened, the acceleration or orientation conditions can prevent the flow of the water and the dissolution of salts; and
- if the mass and volume stresses are important, the calorie quantity absorbed can be insufficient to maintain the elements to be cooled in their operating ranges.

This usual cooling device is therefore not adapted to severe mechanical and thermal environment conditions, envisaged in the framework of the present invention.

SUMMARY OF THE INVENTION

The present invention has for object a cooling device making it possible to remedy at least some of the above-mentioned disadvantages.

According to the invention, said cooling device comprises:
- a sealed envelope comprising at least two reagents, the two reagents being such that bringing them into contact generates an endothermic chemical reaction;
- at least one separation membrane configured to separate the two reagents in a storage position;
- at least one contact-making system capable of being activated and configured to bring into contact said at least two reagents when it is activated, in order to trigger the endothermic chemical reaction;
- an interface element for the activation of the contact-making system; and
- at least one thermal interface comprising at least one metal soleplate, thermally conductive, whose one (inner) of the faces is subjected, if necessary, to the endothermic chemical reaction and whose other (outer) face is accessible from the outside of the cooling device.

Thus, thanks to the invention, the cooling device comprises a plurality of reagents, which on the one hand, are arranged in a sealed envelope and are separated in a storage position so as to avoid any unintentional triggering of the generation of cold, and which, on the other hand, are likely to be brought into contact to trigger an endothermic chemical reaction (following an external command received by the interface element). Putting into contact of the reagents therefore generate a chemical reaction, i.e. a transformation of the material during which the chemical reactions are modified, and other chemical species are created. It will be noted that the endothermic reaction provided by document U.S. Pat. No. 5,184,470 is not a chemical reaction, but a simple dissolution of salts in water which does not cause a transformation of material.

The cooling device thus generates, during putting into contact, a cold zone for the evacuation of calories from elements in contact with the outer face of the metal soleplate.

In the framework of the present invention, the generation of cold (i.e. the energy absorption) is obtained by at least one endothermic chemical reaction between at least two reagents, whose formation enthalpy of the reaction products is greater than that of its reagents.

Preferably, the reagents are such that bringing them into contact generates, as an endothermic chemical reaction, an endothermic base acid reaction. Numerous reagents can be envisaged for this purpose, as indicated below as an illustration.

A single-use cooling device is thus obtained, thanks to the invention, which is particularly effective, and which does not present the disadvantages of a cooling device based on the dissolution of a salt in water in liquid form.

In addition, in the present invention, the reagents are stored separately and are only brought into contact during the receiving of an external activation (or triggering) order or command. The reaction cannot therefore occur randomly and in a non-triggered manner.

The present invention can therefore be implemented with any pair of reagents (solids, liquids and/or gaseous) making it possible to respect the desired operating conditions.

In the framework of the present invention, by pair (of reagents), this means the at least two reagents which generate an endothermic chemical reaction when they are brought into contact; it can therefore be in addition to two reagents which react together.

In a particular embodiment, the cooling device comprises a plurality of reagent pairs, and for each of said reagent pairs, the reagents of the pair are able to be brought into contact to generate an endothermic chemical reaction.

In a preferred embodiment, if the endothermic chemical reaction releases a compound in gaseous form, the cooling device comprises means configured to reduce the pressure generated by the endothermic chemical reaction in a chamber wherein said endothermic chemical reaction occurs.

In a first embodiment example, said means intended to reduce the pressure comprising at least one mechanical element, for example an overpressure valve, able to evacuate gases from said chamber. In a second embodiment, complementarily to or as a variant of said first embodiment example, said means intended to reduce the pressure comprise at least one deformable wall (of said chamber).

In the framework of the present invention, the cooling device and in particular, the contact-making system can be produced in different ways.

In a first embodiment, the contact-making system comprises a rotating blade system configured to tear the separation membrane in order to bring the two reagents into contact.

In this first embodiment, advantageously, the rotating blade system is also configured to mix the two reagents after they have been brought into contact.

Furthermore, in a second embodiment, the contact-making system comprises at least one pyrotechnical trigger.

In this second embodiment, advantageously, the pyrotechnical trigger is configured to act on one of the reagents to which it is associated, in order to project it so as to tear the separation membrane and to bring it into contact with the other reagent. Advantageously, the cooling device comprises at least two assemblies formed, each, of a reagent and of an associated pyrotechnical trigger.

Moreover, in a third embodiment, one of the reagents is in liquid form or dissolved in a liquid, the other of the reagents is solid and is provided with extended holes (or capillaries), and the contact-making system comprises at least one servo pump configured to make the liquid reagent circulate in the extended holes of the solid reagent.

BRIEF DESCRIPTION OF THE FIGURES

The appended figures will make it well understood how the invention can be achieved. In these figures, identical references designate similar elements. More specifically.

DETAILED DESCRIPTION

Figure 1:
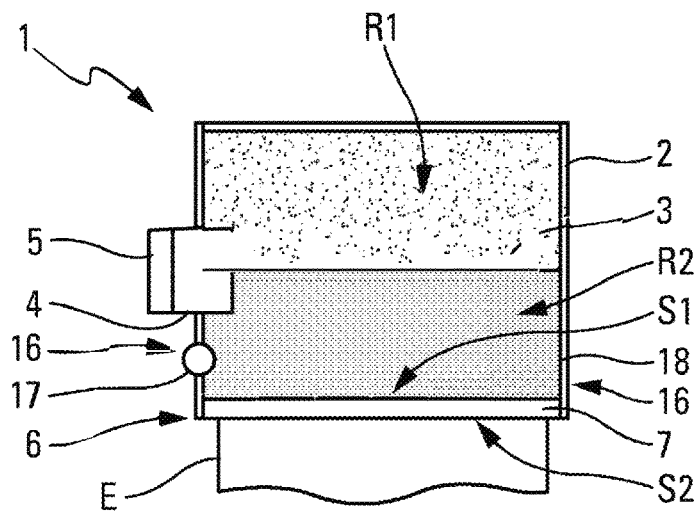
FIG. 1 is the synoptic diagram of a cooling device.

The device 1, allowing to illustrate the invention and represented very schematically in FIG. 1, is a cooling device, which is intended to create a cold zone (or one cold point or cold points).

According to the invention, said cooling device 1 comprises, as represented in FIG. 1:
- a sealed envelope 2 comprising at least two reagents R1 and R2. These two reagents R1 and R2 are such that when they have been brought into contact an endothermic chemical reaction is generated;
- at least one separation membrane 3 configured to separate the two reagents R1 and R2 in a storage position, i.e. before when they have been brought into contact;
- at least one contact-making system 4 able to be activated and configured to bring said reagents R1 and R2 into contact when it is activated, and this in order to trigger the endothermic chemical reaction;
- an interface element 5 allowing to receive an order from the outside of the cooling device 1 in order to activate the contact-making system 4; and
- at least one thermal interface 6 comprising at least one metal soleplate 7, which is thermally conductive.

A so-called inner face S1 of the metal soleplate 7 is situated inside the sealed envelope 2 and is subjected, if necessary, directly to the endothermic chemical reaction generated by the coming into contact of the reagents R1 and R2.

The other so-called outer face S2 of the metal soleplate 7 is accessible from the outside of the cooling device 1 and, in particular, from the outside of the sealed envelope 2.

Thus, thanks to the invention, the cooling device 1 is compact, and it comprises a plurality of reagents R1, R2 which:
- are arranged in a sealed (and hermetic) envelope 2 in a storage position. By "storage position", this means the separation position of the two reagents, comprising both the storage situations of the system (for example, a missile) using the cooling device 1 and possibly operating situations of this system not requiring any cooling. Thanks to this sealed envelope 2, the components of the cooling device 1 and in particular, the reagents R1 and R2 are protected from the external conditions and in particular, from external liquids;
- are separated (or isolated) from one another in the storage position, by the separation membrane 3 which is also sealed and inert, so as to avoid any coming into contact and therefore any unintentional triggering of the endothermic chemical reaction;
- are likely to be brought into contact to generate the endothermic chemical reaction following an external command, in a so-called contact-making or cold generation position.

This external triggering (or activation) command (or order) is generated by a usual system and is transmitted from the outside of the cooling device 1 to the interface element 5 which transmits it, then, to the contact-making system 4 inside the cooling device 1 to activate (or trigger) said contact-making system 4.

The reagents are therefore stored separately and are only brought into contact during the receiving of an external activation (or triggering) order or command. The reaction cannot therefore occur randomly or in a non-triggered manner.

The cooling device 1 thus generates, during the bringing into contact of the reagents R1, R2, a cold zone for the evacuation of calories from elements in contact with the outer face S2 of the metal soleplate 7 of the thermal interface 6.

In the framework of the present invention, the generation of cold (i.e. the absorption of energy) is obtained by at least one endothermic chemical reaction between at least two reagents, whose formation enthalpy of the reaction products is greater than that of its reagents.

Figure 6:
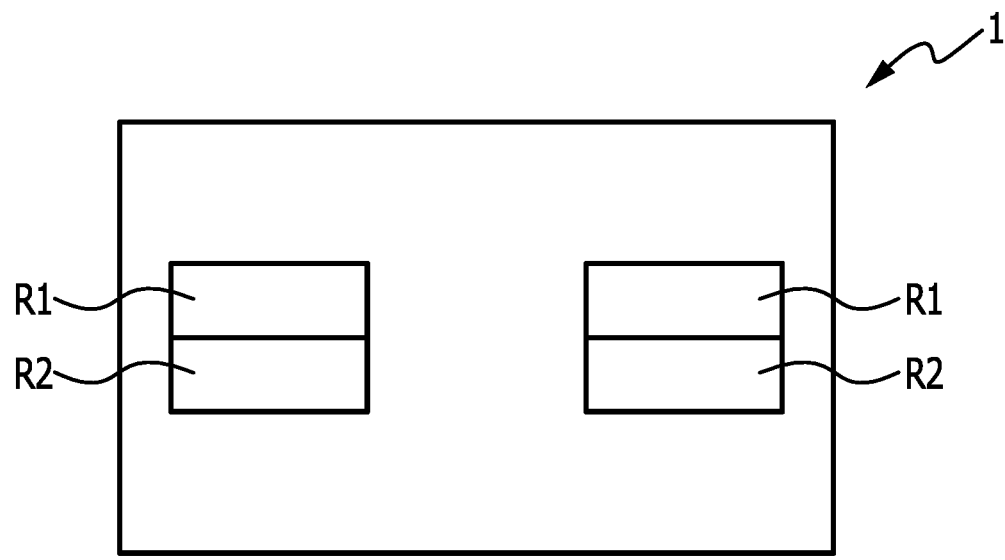
FIG. 6 schematically shows another embodiment of a cooling device.

In a particular embodiment shown in FIG. 6, the cooling device 1 comprises a plurality of pairs of reagents, for example two, three, etc. pairs of reagents. In this particular embodiment, for each of said pairs of reagents, the reagents of the pair are separated in the storage position and able to be brought into contact to generate an endothermic chemical reaction.

In this particular embodiment, as a function of the triggering instants of the different endothermic reactions:
either several successive generations of cold can be obtained, if the bringing into contact of the pairs of reagents are successive;
or the cold obtained can be generated by all of the different reactions if the different endothermic reactions are triggered simultaneously.

It can also be envisaged to provide the two preceding types of operation for one single and same cooling device 1.

As a function of the endothermic chemical reaction considered, it is also possible to bring into contact more than two reagents to generate the endothermic chemical reaction.

In a preferred embodiment, the reagents are such that bringing them into contact generates, as an endothermic chemical reaction, an endothermic base acid reaction. Numerous reagents can be considered, as indicated below as an illustration.

As an example, the reagents can be octahydrated barium hydroxide and an ammonium salt, and in particular octahydrated barium hydroxide and ammonium chloride.

The reaction between the octahydrated barium hydroxide and the ammonium chloride is an endothermic base acid reaction:

Ba(OH)2.8H2O(s)+2NH4Cl(s)→BaCl2.2H2O(s)+ 2NH3(aq)+8H2O(l).

In the framework of the present invention, other endothermic chemical reactions and in particular other endothermic base acid reactions can be envisaged. Endothermic base acid reactions can be cited as a (non-limiting) illustration:
between octahydrated barium hydroxide and ammonium thiocyanate:

Ba(OH)2.8H2O(s)+2NH4SCN(s)→Ba(SCN)2(s)+ 10H2O(l)+2NH3(g);

between octahydrated barium hydroxide and ammonium nitrate;
between sodium carbonate and acetic acid;
between sodium hydrogen carbonate and acetic acid:

NaHCO3(s)+CH3COOH(aq)→NaOOCCH3(aq)+ H2O(l)+CO2(g);

between sodium hydrogen carbonate and hydrochloric acid:

NaHCO3(s)+HCl(aq)→NaCl(aq)+H2O(l)+CO2(g);

between sodium hydrogen carbonate and citric acid:

H3C6H5O7(aq)+3NaHCO3(s)→3CO2(g)+3H2O(l)+ Na3C6H5O7(aq);

between ammonium carbonate and a carboxylic acid, for example acetic, propanoic or butanoic acid;
between sodium hydrogen carbonate and citric acid.

The present invention can therefore be implemented with any pair of reagents making it possible to fulfill the desired conditions.

In a particular embodiment, one of said reagents R1 and R2 is therefore octahydrated or monohydrated barium hydroxide, and the other of said reagents R1 and R2 is ammonium chloride. In this case, in a preferred embodiment, the quantity of ammonium chloride is provided in excess with respect to the quantity necessary for the endothermic chemical reaction, and this in a proportion allowing the saturation of water released by the endothermic chemical reaction.

In the framework of the present invention, the reagents R1 and R2 used can therefore be in solid, liquid or gaseous form, except if bringing them into contact causes an endothermic reaction whose majority of the energy absorbed would be by dissolution of a salt in water. If a phase change of one of the reagents or product occurs during its use, it will not constitute the main source of calories absorption. In the abovementioned example, the reagents (octahydrated barium hydroxide and ammonium chloride) are solid or liquid in the desired range of temperatures and the reaction is not based on the dissolution of a salt in liquid water.

Moreover, in a preferred embodiment, if the endothermic chemical reaction releases a compound in gaseous form, the cooling device 1 comprises means 16 configured to reduce an overpressure (generated by the gas or gases released by the endothermic chemical reaction) in the chamber wherein the endothermic chemical reaction occurs. This chamber can correspond to an inner portion or be provided in an inner portion of the sealed envelope 2 or can correspond to the inside of this sealed envelope 2.

In a first embodiment example, said means 16 comprise at least one mechanical element 17 (schematically represented in FIG. 1) which is able to evacuate the gases from said chamber, to the outside of the cooling device 1. This mechanical element 17 can, in particular, correspond to one of the following elements: an overpressure valve, an automatic drainer or a solenoid valve. This mechanical element 17 can be arranged on any of the faces of the cooling device 1, except on the thermal interface 6, and must be connected to the chamber wherein the endothermic chemical reaction occurs.

In a second embodiment example, complementarily to or as a variant of said first embodiment example, said means 16 comprise at least one deformable wall 18 of said chamber, as represented schematically in FIG. 1. This deformable wall 18 allows, via its deformation, to increase the volume of the chamber and thus to limit an overpressure in case of release of a gas.

In the framework of the present invention, the thermal interface 6 can comprise one or more metal soleplates 7. A metal soleplate 7 is achieved, preferably, under the form of a metal plate, flat or curved, of any dimension and made of a metal which is a good thermal conductor, whose inner face S1 is subjected to the cold generated by the endothermic chemical reaction. This cold is transmitted by the metal material (thermally conductive) of the metal soleplate 7 to the outer face S2. The surface of this outer face S2 therefore represents the outer cold zone, generated by the cooling device 1.

By this outer face S2, the cooling device 1 can cool an element E (represented schematically and partially in FIG. 1) such as a component, a device or a system, in particular electronic, which must be cooled. To do this, the outer face S2 can come into contact with a face of this element E, as represented in FIG. 1.

The cooling can thus be done effectively. In addition, the metal soleplate 7 can be adapted to the element to be cooled.

In a preferred embodiment, the metal soleplate 7 comprises one single flat-shaped plate.

Thus, a single-use cooling device 1 is thus obtained, which is particularly effective, which is able to generate a very cold zone (so as to maintain the elements to be cooled in their operating ranges for the applications considered), which is compact, and which has not the disadvantages of cooling devices based on the dissolution of a salt in water.

In the framework of the present invention, the cooling device 1 and in particular the contact-making system 4 can be carried out in different ways.

Three different embodiments are presented below, in connection with FIGS. 2 to 5. The numbered references of the elements represented in the different figures are similar. One of the letters A or B or C have simply been added to these references, as a function respectively of the first, second or third embodiment considered, to clearly differentiate them.

The use of one or the other of these embodiments, depends in particular on the reagents used and on the effectiveness of the embodiment considered for these reagents. The use of one or the other of these embodiments can thus depend, in particular, on physical features of the reagents used (phase, viscosity, corrosivity, etc.) and on integration constraints.

Figure 2:
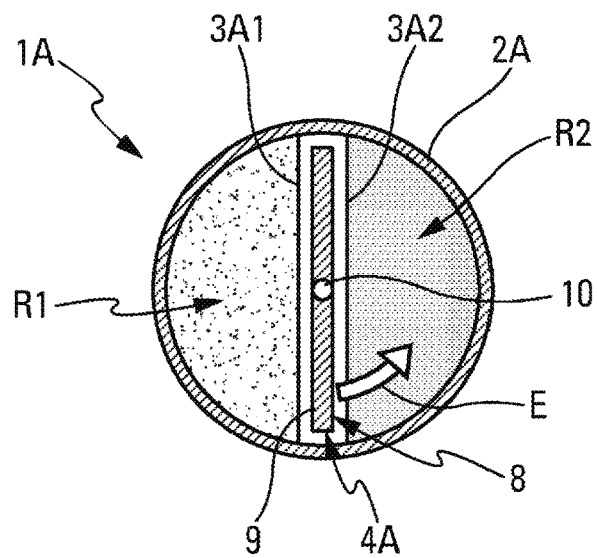
FIGS. 2 and 3 schematically show a first embodiment of the cooling device, respectively as a planar view and as a side view.
Figure 3:
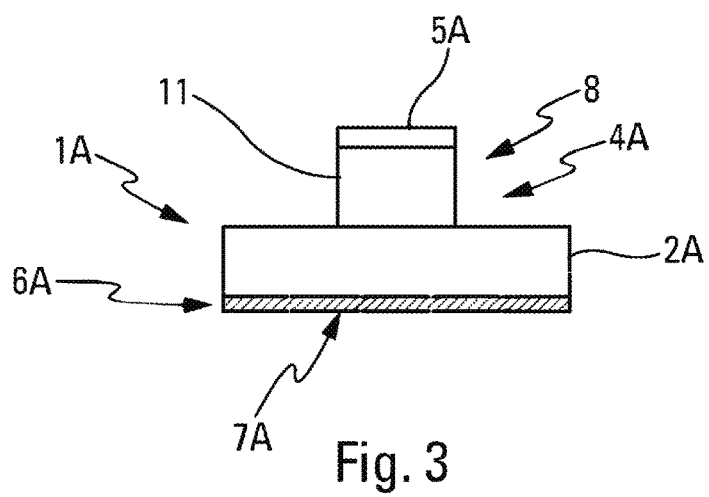

In a first embodiment, represented schematically in FIGS. 2 and 3, the contact-making system 4A of the cooling device 1A comprises a rotating blade 9 system 8.

In this first embodiment, the outer sealed envelope 2A has, for example, the shape of a cylinder portion.

The rotating blade 9 of the system 8 is arranged inside the envelope 2A and it has a length, slightly less than the diameter of a round transversal cross-section of the envelope 2A. This rotating blade 9 is configured to be able to rotate about an axis 10 passing to the center of the round transversal cross-section. The rotating blade 9 is able to be rotated by a motor 11, for example an electric motor, which can be activated via the interface element 5A (FIG. 3). This motor 11 forms part of the system 8.

In the storage position, the cooling device 1A comprises two membranes 3A1 and 3A2 allowing to separate the two reagents R1 and R2. These two membranes 3A1 and 3A2, are for example, mounted parallel to the rotating blade 9.

When it is rotated (after activation of the motor 11), the rotating blade 9 tears the membranes 3A1 and 3A2, by rotating for example in the direction represented by an arrow E in the FIG. 2.

This rotation allows, in addition to tearing the membranes 3A1 and 3A2, to bring the two reagents R1 and R2 into contact.

Furthermore, by continuing to rotate, the rotating blade 9 allows to mix the two reagents R1 and R2 so as to obtain a homogeneous distribution (or mixture) of these two reagents R1 and R2. This homogeneous distribution makes it possible to optimize the endothermic chemical reaction generated by bringing the reagents R1 and R2 into contact.

Figure 4:
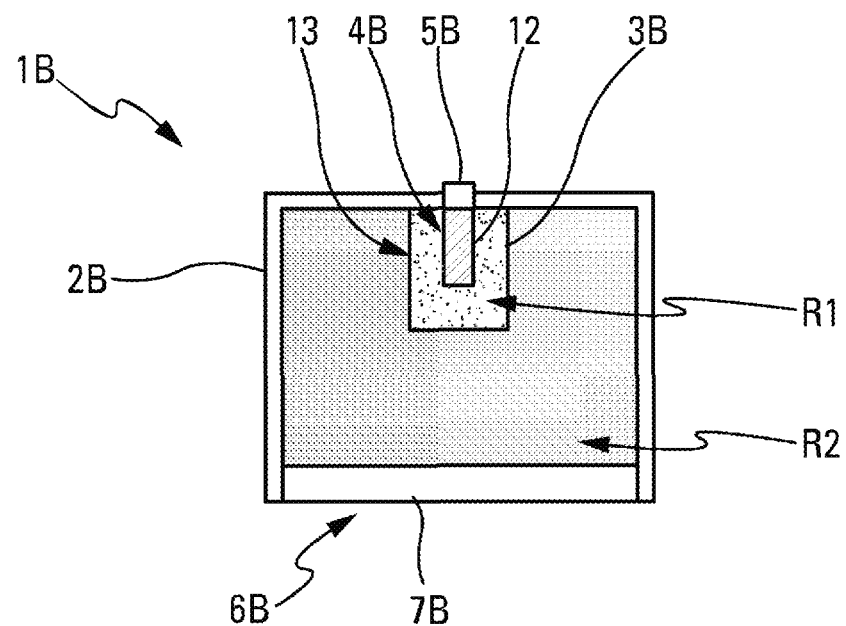
FIG. 4 schematically shows a second embodiment of a cooling device.

Moreover, in a second embodiment represented schematically in FIG. 4, the contact-making system 4B of the cooling device 1B comprises at least one pyrotechnical trigger 12.

In this second embodiment, the pyrotechnical trigger 12 forms with the reagent R1, an assembly 13 which is separated, by the separation membrane 3B, of the reagent R2. The pyrotechnical trigger 12 is configured to act on the reagent R1 when it is activated (via the interface element 5B), in order to project it so as to:
on the one hand, tear the separation membrane 3B; and
on the other hand, bring it into contact with the reagent R2 (in order to generate the endothermic chemical reaction).

Figure 7:
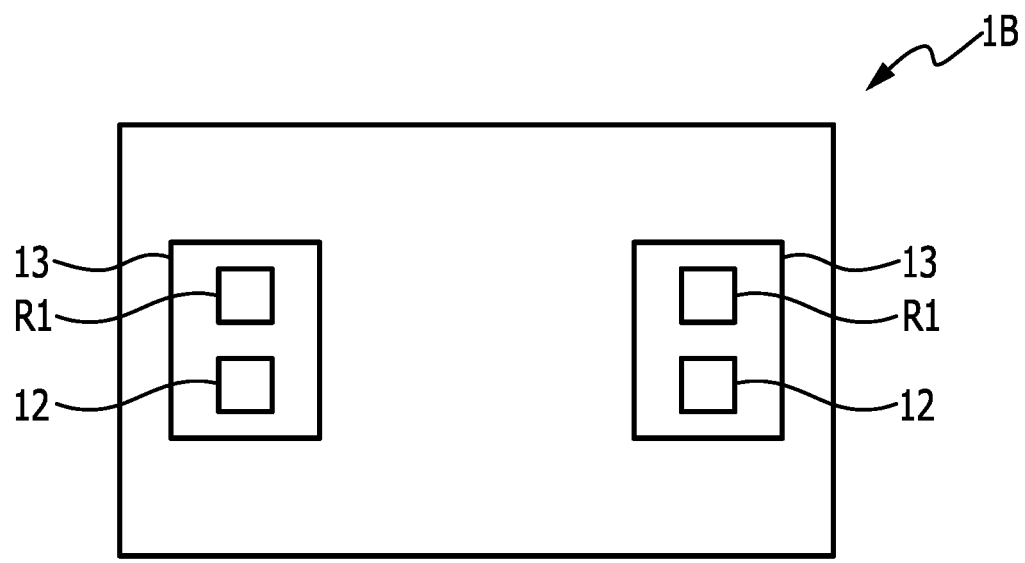
FIG. 7 schematically shows another embodiment of a cooling device.

In a particular embodiment (shown in FIG. 7), the cooling device 1B can comprise several assemblies 13, each formed of a reagent and of an associated pyrotechnical trigger.

Figure 5:
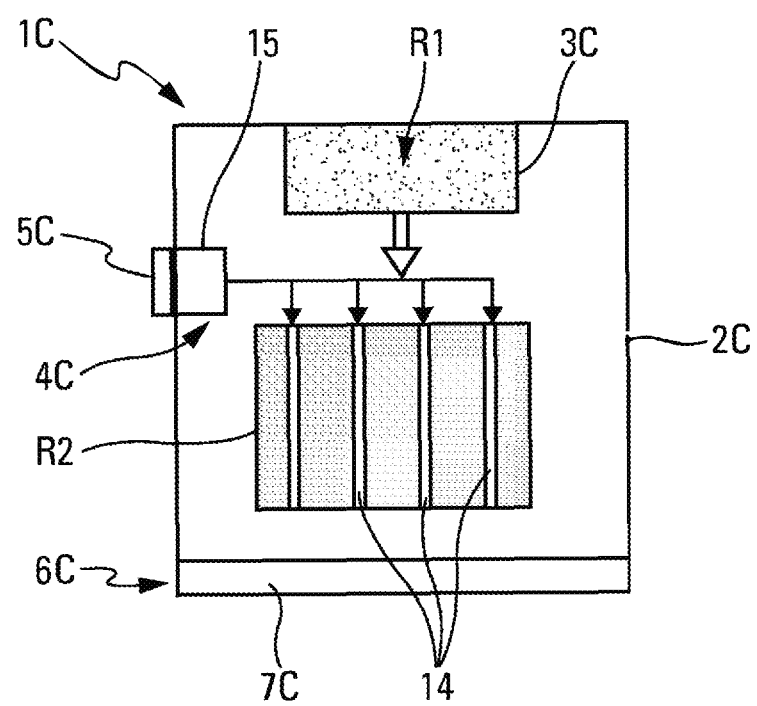
FIG. 5 schematically shows a third embodiment of a cooling device.

Moreover, in a third embodiment, represented schematically in FIG. 5, one R1 of the reagents of the cooling device 1C is in liquid form or dissolved in a liquid, and it is stored in a container formed of a separation membrane 3C. The other reagent R2 is solid, and it is provided with extended holes (or capillaries) 14.

In this third embodiment, the contact-making system 4C of the cooling device 1A comprises at least one servo pump 15 which is configured to make the liquid reagent R1 circulate, when it is activated (via the interface element 5C). More specifically, the servo pump 15 is configured to make the liquid reagent R1 circulate in the extended holes 14 of the solid reagent R2 in order to bring the two reagents R1 and R2 into contact (and thus to generate the endothermic chemical reaction).

It will be noted that, whatever the embodiment, the use of a contact-making system 4 allows to trigger the endothermic chemical reaction under all the orientation and acceleration conditions which can be considered of the equipment provided of the cooling device 1.

Although not represented in FIGS. 2 to 5, each of said embodiments can comprise, if necessary, means such as described above to reduce an overpressure generated by the endothermic chemical reaction in the chamber wherein this endothermic chemical reaction occurs.

The invention claimed is:
1. A cooling device, comprising:
a sealed envelope comprising at least two reagents, the at least two reagents being such that bringing them into contact generates an endothermic chemical reaction;
at least one separation membrane configured to separate the at least two reagents in a storage position;
at least one contact-making system configured to be activated and to bring into contact said at least two reagents when the contact-making system is activated, contact between the at least two reagents triggering the endothermic chemical reaction;
an interface element configured to receive an external command which is transmitted to the contact-making system in order to activate the contact-making system;
at least one thermal interface comprising a flat thermally conductive metal soleplate, wherein one face of the flat thermally conductive soleplate is subjected to the endothermic chemical reaction, another face of the flat thermally conductive soleplate is accessible from outside of the cooling device; and
means configured to reduce a pressure generated by the endothermic chemical reaction in a chamber in which the endothermic chemical reaction occurs.
2. The device according to claim 1,
wherein the device comprises a plurality of groups of the at least two reagents, the reagents of each of the plurality of groups of the at least two reagents being configured to be brought into contact to generate an endothermic chemical reaction.

3. The device according to claim 1,
wherein bringing the at least two reagents into contact generates an endothermic base acid reaction.

4. The device according to claim 1,
wherein the means for reducing the pressure comprise at least one mechanical element configured to evacuate the gases from said chamber.

5. The device according to claim 1,
wherein the means for reducing the pressure comprise at least one deformable wall of said chamber.

6. The device according to claim 1,
wherein the contact-making system comprises a rotating blade system configured to tear the separation membrane.

7. The device according to claim 6,
wherein the rotating blade system is configured to mix the at least two reagents.

8. The device according to claim 1,
wherein the contact-making system comprises at least one pyrotechnical trigger.

9. The device according to claim 8,
wherein the pyrotechnical trigger is configured to project one of the at least reagents to tear the separation membrane and to bring the one of the at least two reagents into contact with the other of the at least two reagents.

10. The device according to claim 9,
wherein the device comprises at least two assemblies, each assembly comprising one of the at least two reagents and an associated pyrotechnical trigger.

11. The device according to claim 1,
wherein one of the at least two reagents is one of a liquid or dissolved in a liquid, the other of the at least two reagents being solid and provided with extended holes, the contact-making system comprising at least one servo pump configured to circulate the liquid reagent in the extended holes of the solid reagent to bring said reagents into contact.

* * * * *